United States Patent

Degen et al.

[11] 4,397,651
[45] Aug. 9, 1983

[54] POLYMERIC DYES DERIVED FROM BIS-REACTIVE METHYLENE COMPOUNDS AND AROMATIC DI-ALDEHYDES FOR PAPER

[75] Inventors: Hans-Juergen Degen, Lorsch; Klaus Grychtol, Bad Durkheim, both of Fed. Rep. of Germany

[73] Assignee: BASF Aktiengesellschaft, Ludwigshafen, Fed. Rep. of Germany

[21] Appl. No.: 291,500

[22] Filed: Aug. 10, 1981

Related U.S. Application Data

[63] Continuation of Ser. No. 217,747, Dec. 18, 1980, abandoned, which is a continuation of Ser. No. 125,905, Feb. 29, 1980, abandoned.

[30] Foreign Application Priority Data

Mar. 7, 1979 [DE] Fed. Rep. of Germany ....... 2908921

[51] Int. Cl.³ ............... C09B 23/10; C09B 69/10
[52] U.S. Cl. ............... 8/506; 8/647; 8/919; 542/447; 542/452; 542/457
[58] Field of Search ............... 8/506, 647, 919

[56] References Cited

U.S. PATENT DOCUMENTS

| | | | |
|---|---|---|---|
| 2,465,412 | 3/1949 | Wilson | 546/176 |
| 4,212,644 | 7/1980 | Desen et al. | 8/506 |
| 4,221,562 | 9/1980 | Pociluyko | 8/506 |
| 4,256,458 | 3/1981 | Desen et al. | 8/506 |
| 4,323,362 | 4/1982 | Desen et al. | 8/506 |

Primary Examiner—A. Lionel Clingman
Attorney, Agent, or Firm—Oblon, Fisher, Spivak, McClelland & Maier

[57] ABSTRACT

Polymeric dyes of the general formula I

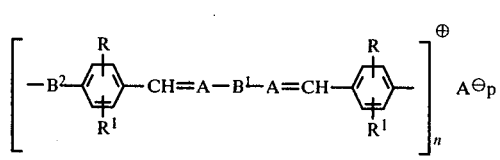

where
A is the radical of a methylene-active compound, which may or may not be quaternized,
$B^1$ and $B^2$ are bridge members which may or may not be quaternized or $B^2$ may be a direct bond,
n is number >1,
p is the number of positive charges,
R is hydrogen, chlorine, bromine, hydroxyl, $C_1$-$C_8$-alkyl, nitro, $C_1$-$C_8$-alkoxy, $C_1$-$C_8$-alkoxycarbonyl, cyano, hydroxycarbonyl, unsubstituted or substituted carbamyl or unsubstituted or substituted amino,
$R^1$ is hydrogen, chlorine, hydroxyl, $C_1$-$C_4$-alkyl or $C_1$-$C_4$-alkoxy or
R and $R^1$ together are an unsubstituted or substituted fused ring, or R and $R^1$ together with $B^2$ are a heterocyclic radical and
$A^\ominus$ is an anion.

2 Claims, No Drawings

POLYMERIC DYES DERIVED FROM BIS-REACTIVE METHYLENE COMPOUNDS AND AROMATIC DI-ALDEHYDES FOR PAPER

This is a continuation of application Ser. No. 217,747, filed Dec. 18, 1980, which is a continuation of Ser. No. 125,905 filed Feb. 29, 1980, both abandoned.

The present invention relates to dyes of the general formula I

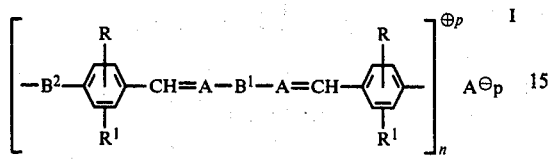

where
- A is the radical of a methylene-active compound, which may or may not be quaternized,
- $B^1$ and $B^2$ are bridge members which may or may not be quaternized or $B^2$ may be a direct bond,
- n is a number >1,
- p is the number of positive charges,
- R is hydrogen, chlorine, bromine, hydroxyl, $C_1$-$C_8$-alkyl, nitro, $C_1$-$C_8$-alkoxy, $C_1$-$C_8$-alkoxycarbonyl, cyano, hydroxycarbonyl, unsubstituted or substituted carbamyl or unsubstituted or substituted amino,
- $R^1$ is hydrogen, chlorine, hydroxyl, $C_1$-$C_4$-alkyl or $C_1$-$C_4$-alkoxy or
- R and $R^1$ together are an unsubstituted or substituted fused ring, or R and $R^1$ together with $B^2$ are a heterocyclic radical and
- $A^\ominus$ is an anion.

Radicals $B^1$ may be symmetrical or unsymmetrical. They may be aliphatic or aromatic and may contain heteroatoms; examples are unsubstituted or substituted alkylene radicals which may or may not be interrupted by oxygen, —NH—, sulfur, carbamyl, carbonyloxy,

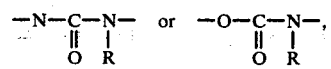

unsubstituted or substituted phenylene, diphenylene or naphthylene radicals, or saturated cycloalkylene radicals which may or may not contain hetero-atoms. More specific examples of $B^1$ are:

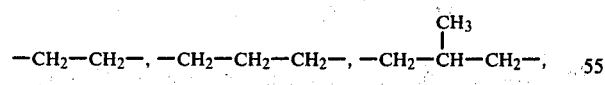

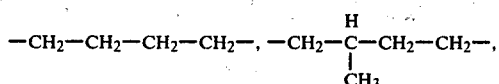

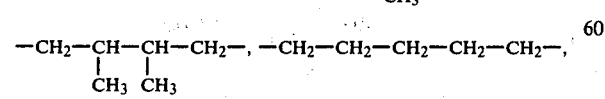

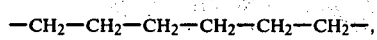

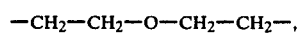

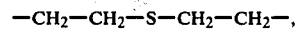

-continued

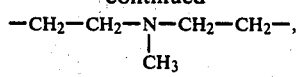

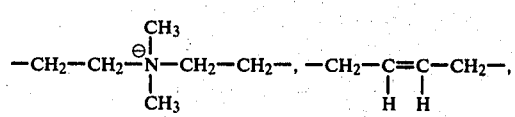

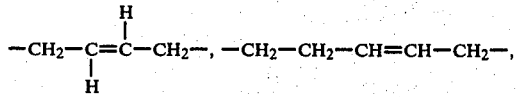

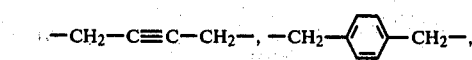

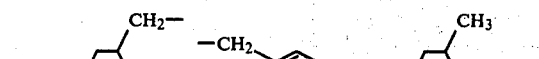

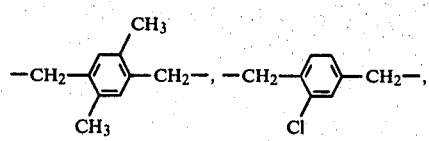

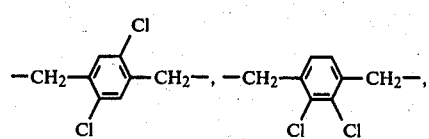

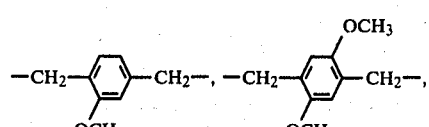

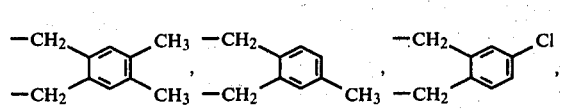

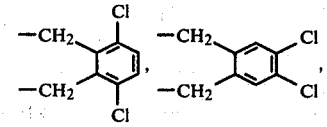

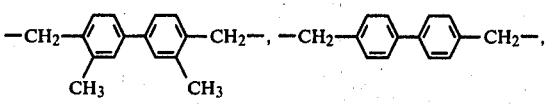

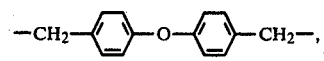

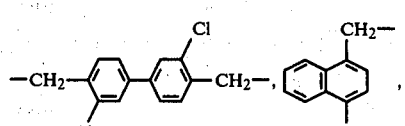

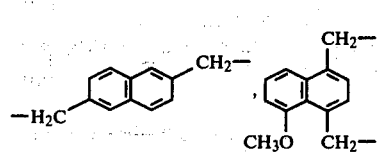

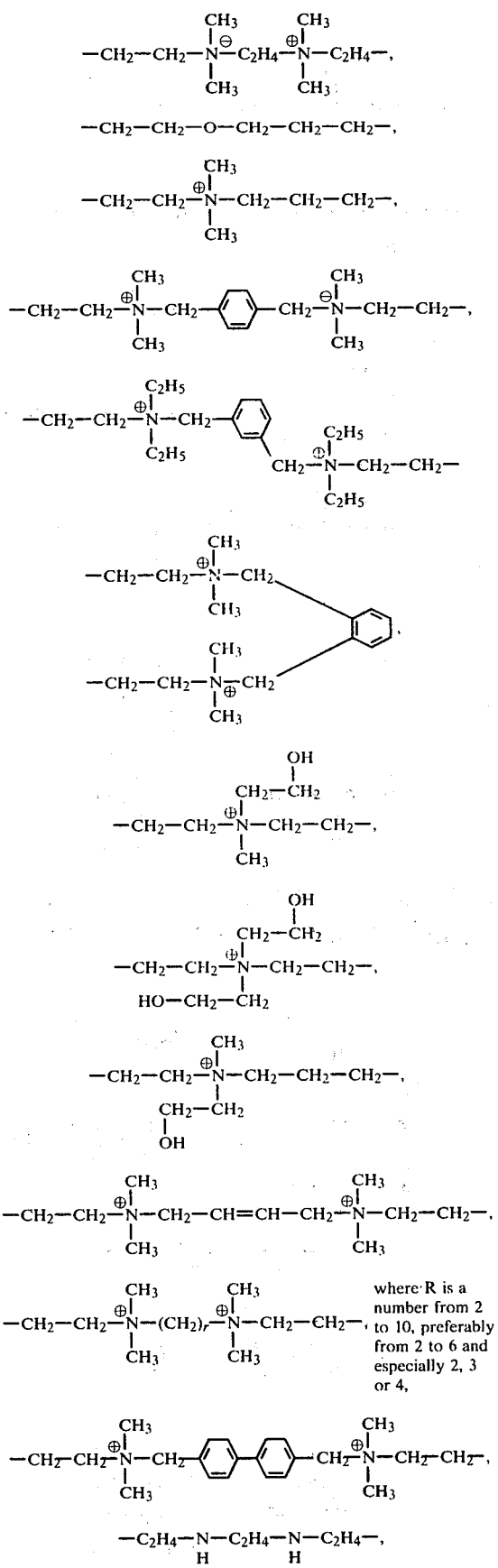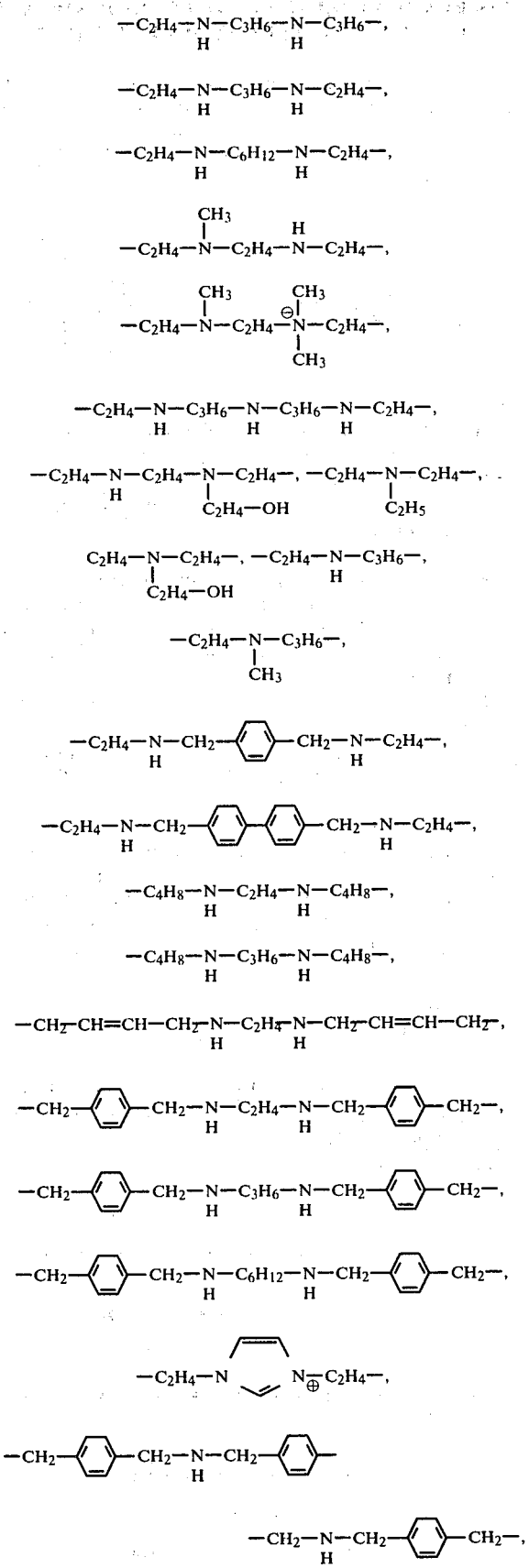

-continued

−C₂H₄−N(H)−C(=O)−N(H)−C₂H₄−, −C₂H₄−N(H)−C(=O)−O−C₂H₄−,

−C₂H₄−N(H)−C(H₂)−N(H)−C₂H₄−,

−C₂H₄−O−C(=O)−CH₂−N(H)−C₂H₄−,

−C₂H₄−N(H)−C(=O)−CH₂−O−C₂H₄−,

−C₂H₄−N(H)−C(=O)−C₂H₄−N(H)−C₂H₄−, and

−C₂H₄−N(H)−⌬−N(H)−C(=O)−N(H)−⌬−N(H)−C₂H₄−

B² may be a direct bond or, if it is a bridge member, it is a symmetrical or unsymmetrical radical derived from an amine, oligoamine or polyamine; examples are:

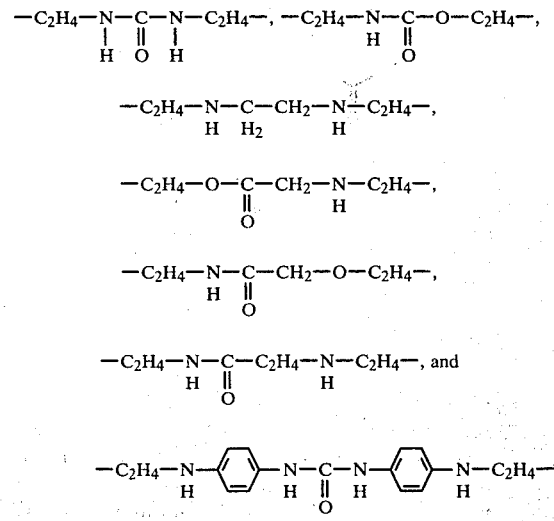

-continued

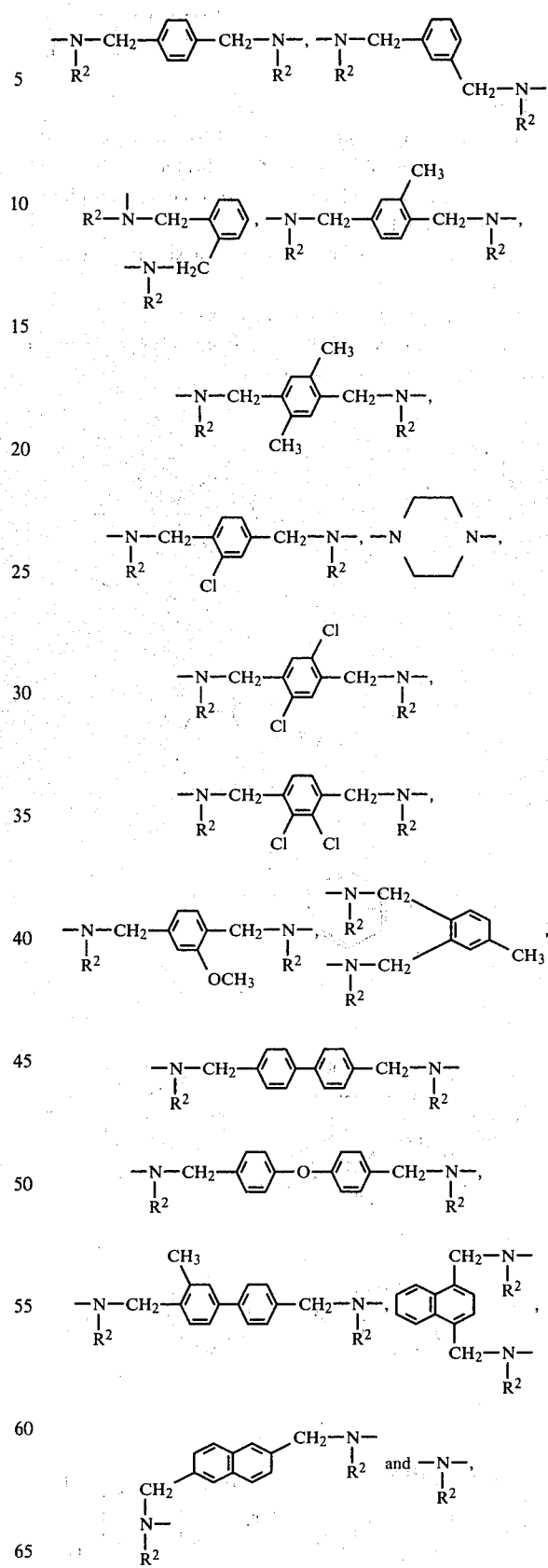

as well as bridge members of the general structure

-continued

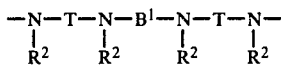

where
T is a straight-chain or branched alkylene radical which is unsubstituted or substituted by hydroxyl, $C_1$–$C_4$-alkoxy, chlorine or bromine, or is a phenylene radical, and
$R^2$ is hydrogen or unsubstituted or substituted alkyl, and
$B^1$ and r have the stated meanings.

The radicals A are derived from methylene-active compounds; specific examples are:

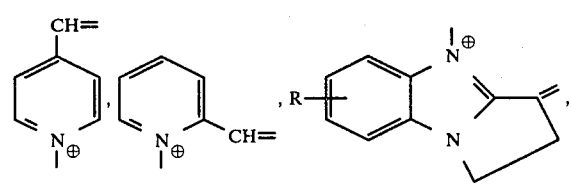

-continued

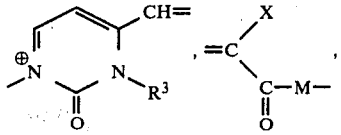

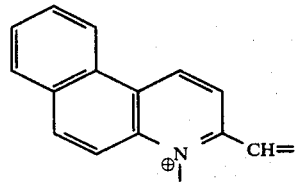

where
X is hydrogen, cyano, $C_1$–$C_8$-carbamyl, $C_1$–$C_8$-alkoxycarbonyl, an unsubstituted or substituted heterocyclic radical which may or may not be quaternized, or unsubstituted or substituted $C_1$–$C_4$-alkyl,
$R^3$ is unsubstituted or substituted alkyl, and
M is an oxygen bridge or an imino group having the structure

and
X and $R^2$ may form a ring interrupted by heteroatoms.

Radicals $R^3$ may be the same or different and are, for example, methyl, ethyl, propyl, butyl, benzyl, tolyl, p-chlorobenzyl, cyanoethyl, hydroxyethyl, $C_1$–$C_4$-alkoxyethyl, 2-hydroxypropyl or carbamylmethyl.

Examples of radicals X are methyl, ethyl, propyl, butyl, cyano, methylaminocarbonyl, ethylaminocarbonyl, propylaminocarbonyl, butylaminocarbonyl, carbamyl, methoxycarbonyl, ethoxycarbonyl, benzimidazol-2-yl, N-methyl-benzimidazol-2-yl, N,N'-dimethyl-benzimidazol-2-ium, benzthiazol-2-yl, N-methyl-benzthiazol-2-ium, benzoxazol-2-yl and N-methyl-benzoxazol-2-ium.

Examples of preferred radicals $R^3$ are methyl, ethyl, cyanoethyl and hydroxyethyl, and examples of preferred radicals X are cyano, methyl, carbamyl and $C_1$–$C_4$-alkylcarbamyl.

Anions $A^\ominus$ are organic or inorganic, and specific examples are fluoride, chloride, bromide, iodide, perchlorate, hydrogen sulfate, sulfate, aminesulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoborate, acetate, chloroacetate, cyanoacetate, hydroxyacetate, aminoacetate, methylaminoacetate, dichloroacetate and trichloroacetate, 2-chloropropionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenylsulfonate and chlorotoluenesulfonate.

A compound of the formula I may be prepared, for example, by condensing a compound of the formula II

   II with a compound of the formula III

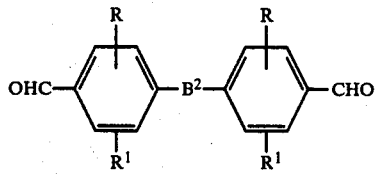   III where $B^1$, $B^2$, $A^\ominus$, $R^1$ and R have the stated meanings and m is a number up to 10, preferably 1, 2, 3 or 4.

An alternative synthesis is to react a compound of the formula IV

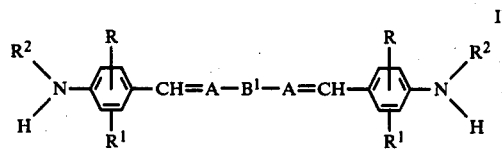   IV with a compound of the formula V

Y—$B^1$—Y   V where Y is a radical of an anionic leaving group.

A compound of the formula I can also be prepared by reacting a compound of the formula VI

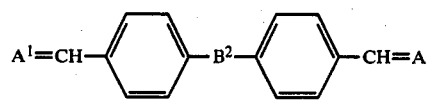   VI with a compound of the formula V, $A^1$ being, for example,

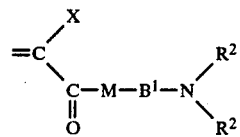

A compound of the formula I can also be prepared by reacting a compound of the formula VII

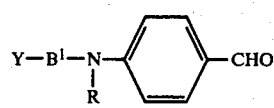   VII with a compound of the formula II to give a compound of the formula VIIa

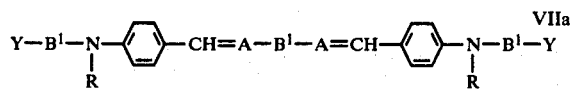   VIIa and then reacting this with an amine of the formula $H_2B^2$.

Advantageously, the components are heated, in the presence of absence of a solvent, to an elevated temperature, for example from 30° to 200° C., preferably from 60° to 150° C., and a condensing agent, such as an acid or base, is then added. Specific examples of condensing agents are NaOH, KOH, MgO, Ca(OH)$_2$, primary, secondary or tertiary amines, HCl, HCOOH, CH$_3$COOH, toluenesulfonic acid, zinc chloride, or a mixture such as NaOOCH$_3$/CH$_3$COOH, or triethylamine/CH$_3$COOH.

Advantageous solvents are organic water-miscible compounds, eg. ethanol, glycol, glycerol, methylglycol, thiodiglycol, dimethylformamide, dimethylsulfoxide, acetamide, glacial acetic acid, acetic anhydride, formic acid and mixtures of such solvents with water. To produce fluid dye formulations it is possible to use alcohols, or more especially water, inorganic and organic acids and mixtures of these with water.

Details of how to conduct the reaction may be found in the Examples, where parts and percentages are by weight, unless stated otherwise.

The compounds of the formula I are particularly suitable for the wet-end coloring of sized and unsized papers, and have a high affinity for both ligneous (groundwood-containing) and lignin-free paper pulps. The majority of the dyes are substantive, and the waste water from the coloring process is almost or completely colorless. The hues achievable range from yellow to blue.

Compounds of particular importance are those of the formula VIII

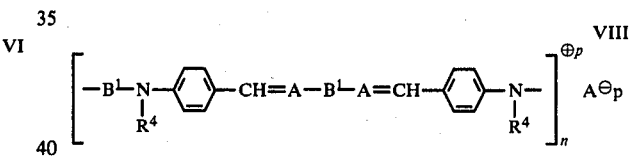   VIII where

A, $B^1$, n, p and $A^\ominus$ have the meanings given for formula I and $R^4$ is $C_1$-$C_4$-alkyl, β-cyanoethyl, cyanomethyl, β-chloroethyl, β-hydroxyethyl, 2-hydroxy-3-chloropropyl or β-$C_1$-$C_4$-alkoxyethyl.

The radicals $B^1$, A and $R^4$ may be identical or different.

Examples of preferred radicals are:

$B^1$: ethylene, propylene, butylene, o-, m- and p-xylylene, p-diphenylene and but-2-enylene and A:

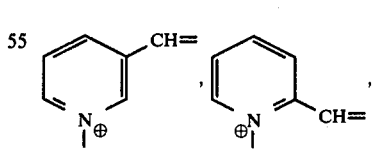

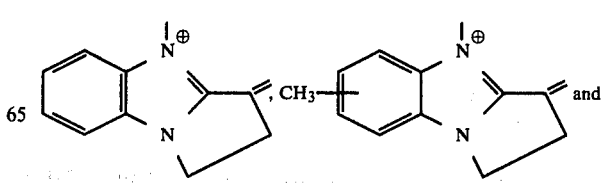

-continued

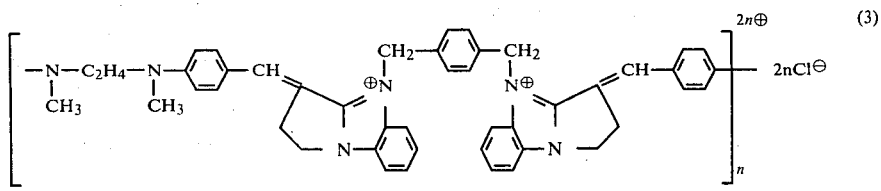

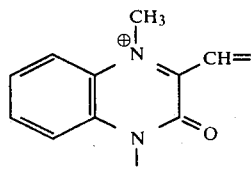

EXAMPLE 1

10 ml of pyrrolidine are added to 30 parts of the dialdehyde of the formula 1

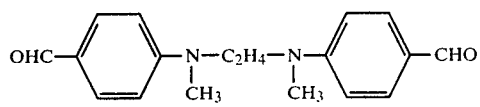

and 52 parts of the compound of the formula 2

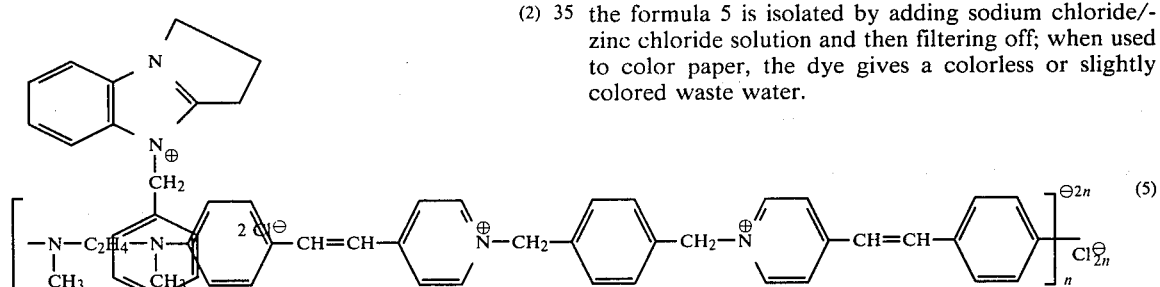

in 50 ml of glycol at 70° C. and the mixture is kept at this temperature for 2 hours. On adding 25 ml of glacial acetic acid, a fluid formulation of an oligomeric or polymeric dye of the formula 3

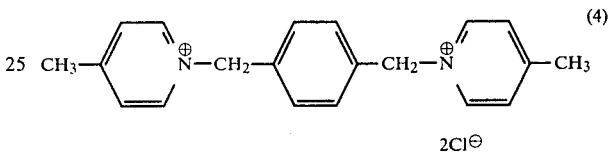

having good solubility in water and a long shelf life, is obtained. The dye colors ligneous bleached and unbleached paper in yellow hues. The waste water is slightly colored or colorless.

EXAMPLE 2

18 Parts of the compound of the formula 4

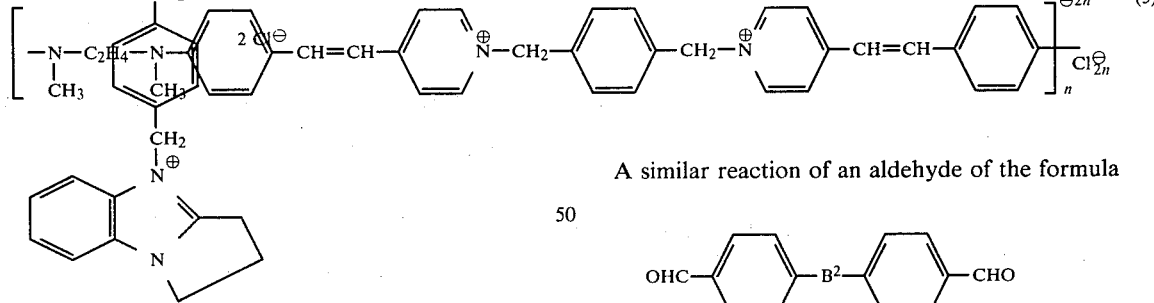

and 15 parts of the dialdehyde of the formula 1, dissolved in 50 ml of thiodiglycol, are heated, in the presence of 5 ml of pyrrolidine, for 2 hours at 80° C. The batch is then poured into 300 ml of water and is acidified with 2 N hydrochloric acid, and an orange dye of the formula 5 is isolated by adding sodium chloride/zinc chloride solution and then filtering off; when used to color paper, the dye gives a colorless or slightly colored waste water.

A similar reaction of an aldehyde of the formula

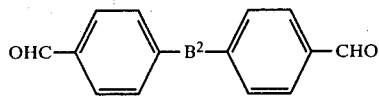

with a compound of the general formula $$H_2A^{\oplus}-B^1-A^{\oplus}H_2 2A^{\ominus}$$

gives a compound of the general formula

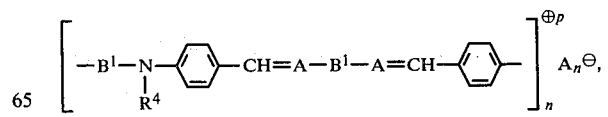

of which more specific examples are given in Table 1 below, $A^{\ominus}$ being chloride:

TABLE 1

| $B^1$ | $AH_2$ | $-N-B^1-N-$<br>$\phantom{xx}\|\phantom{xxxx}\|$<br>$\phantom{xx}R^4\phantom{xxx}R^4$ | Hue |
|---|---|---|---|
| —CH₂—C₆H₄—CH₂— (para) | benzimidazole-pyrrolidine fused | —N(CH₃)—C₂H₄—N(C₂H₅)— | yellow |
| " | " | —N(CH₃)—CH₂—CH=CH—CH₂—N(CH₃)— | " |
| " | " | —N(CH₃)—CH₂—C₆H₄—CH₂—N(CH₃)— | " |
| " | " | —N(CH₃)—(CH₂)₄—N(CH₃)— | " |
| " | " | —N(C₂H₅)—CH₂—CHCl—CH₂—N(C₂H₅)— | " |
| —CH₂—C₆H₄—CH₂— (meta) | " | —N(CH₃)—C₂H₄—N(CH₃)— | " |
| —C₂H₄— | 6-methylbenzimidazole-pyrrolidine | —N(C₂H₅)—C₂H₄—N(CH₃)— | " |
| —C₄H₈— | 6-methylbenzimidazole-pyrrolidine | —N(CH₃)—CH₂—C₆H₄—CH₂—N(CH₃)— | " |
| —CH₂—CH=CH—CH₂— | 5-chlorobenzimidazole-pyrrolidine | —N(CH₃)—CH₂—CH=CH—CH₂—N(CH₃)— | " |
| —CH₂—C₆H₄—CH₂— (para) | 4-methylpyridine | —CH₂—C₆H₄—CH₂— | orange |
| " | " | —N(C₂H₄—OH)—C₂H₄—N(C₂H₄—OH)— | " |
| —CH₂—C₆H₄—CH₂— (meta) | " | —N(CH₃)—CH₂—C₆H₄—CH₂—N(CH₃)— (meta) | " |

TABLE 1-continued

| $B^1$ | $AH_2$ | $-N-B^1-N-$<br>$\phantom{-N-}R^4\phantom{-N-}R^4$ | Hue |
|---|---|---|---|
| $-C_2H_4-$ | " | $-N-C_2H_4-N-$<br>$\phantom{-N-}C_2H_5\phantom{-N-}C_2H_5$ | " |
| $-CH_2-CH=CH-CH_2-$ | " | $-N-CH_2-CH=CH_2-N-$<br>$\phantom{-N-}CH_3\phantom{-N-}CH_3$ | " |
| $-CH_2-CH=CH-CH_2-$ | 2-methylpyridine | $-N-CH_2-CH=CH_2-N-$<br>$\phantom{-N-}CH_3\phantom{-N-}CH_3$ | yellow |
| " | " | $-N-C_2H_4-N-$<br>$\phantom{-N-}CH_3\phantom{-N-}CH_3$ | " |
| $-CH_2-\text{(1,3-phenylene)}-CH_2-$ | " | " | " |
| $-CH_2-\text{(1,4-phenylene)}-CH_2-$ | " | " | " |
| $-CH_2-\text{(1,2-phenylene)}-CH_2-$ | " | " | " |
| " | " | $-N-C_2H_4-N-$<br>$CN-H_2C-H_2C\phantom{XX}CH_2-CH_2-CN$ | " |
| $-C_2H_4-$ | " | $-N-C_2H_4-N-$<br>$\phantom{-N-}CH_3\phantom{-N-}CH_3$ | " |
| $-C_4H_8-$ | " | " | " |
| $-CH_2-C\equiv C-CH_2-$ | " | " | " |
| $-CH_2-\text{(1,4-phenylene)}-CH_2-$ | 2,3,3-trimethylindolenine | $-N-CH_2-\text{(1,4-phenylene)}-CH_2-N-$<br>$\phantom{-N-}CH_3\phantom{XXXXXXXXX}CH_3$ | red |
| $-C_4H_8-$ | " | $-N-C_4H_8-N-$<br>$\phantom{-N-}C_2H_5\phantom{-N-}C_2H_5$ | " |
| " | 5-chloro-2,3,3-trimethylindolenine | " | " |
| " | 1,4-dimethyl-3-methylquinoxalinium derivative | " | blue |

TABLE 1-continued

| $B^1$ | $AH_2$ | $\begin{array}{c}-N-B^1-N-\\ \phantom{-N-}|\phantom{B^1}|\phantom{-N-}\\ \phantom{-N-}R^4\phantom{-B^1-}R^4\end{array}$ | Hue |
|---|---|---|---|
| $-CH_2-\!\!\bigcirc\!\!-CH_2-$ | " | $-N-CH_2-\!\!\bigcirc\!\!-CH_2-N-$ $\phantom{-N}|\phantom{-CH_2-\bigcirc-CH_2-}|$ $\phantom{-N}CH_3\phantom{-CH_2-\bigcirc-CH_2-}CH_3$ | " |
| $-C_3H_6-$ | " | " | " |
| $-C_4H_8-$ | " | " | " |
| " | " | $-N-C_2H_4-N-$ $\phantom{-N}|\phantom{-C_2H_4-}|$ $\phantom{-N}CH_3\phantom{-C_2H_4}CH_3$ | " |
| $-C_4H_8-$ | 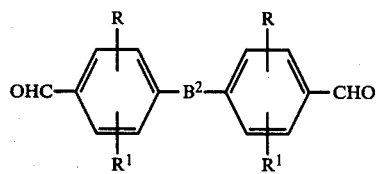 | $-N-C_2H_4-N-$ $\phantom{-N}|\phantom{-C_2H_4-}|$ $\phantom{-N}CH_3\phantom{-C_2H_4}CH_3$ | reddish violet |
| " | 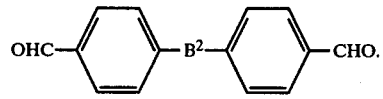 | " | " |

Instead of the pure bis-aldehydes of the formula

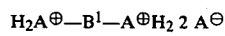

it is of course possible to use mixtures of bis-aldehydes which differ in respect of the bridge members $B^2$ or in respect of R and/or $R^1$. Equally, instead of using the pure compound $$H_2A^\oplus-B^1-A^\oplus H_2 \; 2 \; A^\ominus$$

mixtures of this type of compound, in which the radicals A and/or $B^1$ differ, may be employed. In this way it is possible to vary the solubility, the affinity for paper and, in particular, the hue. Table 2 below shows by way of an illustration, which applies to all the preceding and subsequent Examples, that by the stated variation in the reactants it is possible to achieve a continuous change in hue, as would for example also be possible by mixing the two polymers based on individual starting compounds $H_2A-B^1-AH_2$ and

OHC—⌬—$B^2$—⌬—CHO.

It appears reasonable to assume that the products synthesized in this way have the structure of random copolymers, though it cannot be ruled out that homopolymers may also form under the reaction conditions.

Following the general instruction of Example 1, the 52 parts of compound 2 are replaced by the amounts, shown in the Table below, of compound of the formula 2 and compound of the formula 4.

TABLE

| Amounts of compounds of the formula | | Hue |
|---|---|---|
| 2 | 4 | |
| 46.8 | 3.6 | yellowish orange |
| 41.6 | 7.2 | yellowish orange |
| 36.4 | 10.8 | orange |
| 31.2 | 14.4 | orange |
| 26.0 | 18.0 | orange |
| 20.8 | 21.6 | orange |
| 15.6 | 25.2 | orange |
| 10.4 | 28.8 | orange |
| 5.2 | 32.4 | orange |

With increasing proportion of compound of the formula 4, the hue shifts from strongly yellowish orange to reddish-orange.

Depending on the synthesis, end groups of the dyes of the formulae 3 and 5 and of all the other dyes claimed are the radicals

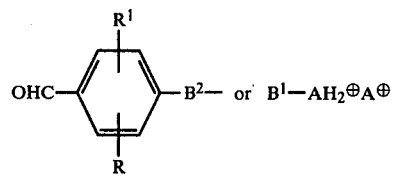

the reactive centers of which may or may not have been reacted further. Possible reactants for the free aldehyde group of the end group

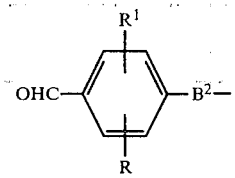

are in principle those systems which are capable of reacting with an aldehyde group, in particular condensable methylene-active components, eg. malodinitrile. Suitable reactants for the free radicals —$B^1$—$AH_2^{\oplus}A^{\ominus}$ are in particular aldehydes, eg. benzaldehyde. In this context, the possibility of shading by using methylene-active compounds which on condensation with p-aminobenzaldehydes give colored compounds of a different hue from the dye which is to be shaded is of particular importance.

If, for example, when synthesizing the dye of Example 1, 3 g of N-methyl-γ-picolinium methosulfate are added to the reaction mixture before or after adding glacial acetic acid the dye obtained shows a shift in hue toward orange compared to the dye of Example 1.

Carbonyl-containing compounds may be used similarly for shading, provided they give condensation products of a different color than that of the dye to be shaded. For example, the addition of 3 g of p-dimethylaminobenzaldehyde to the reaction mixture of Example 1 at 60° C., before addition of glacial acetic acid, produces a shift in hue toward red compared to the dye of Example 1.

The degree of polymerization of the compounds substantially depends on the reaction conditions, especially the reaction time and the reaction temperature. The substantivity of the dyes on paper decreases slightly with decreasing reaction time and decreasing reaction temperature, but on the other hand the brilliance of the colorations increases. The temperature variations shown in Table 2 below are typical of all the Examples given, unless stated otherwise.

TABLE 2

| Amounts of chemicals employed as in Example 1 | |
|---|---|
| Temperature (°C.) | Time (h) |
| 40 | 10 |
| 50 | 7 |
| 50 | 3 |
| 50 | 1 |
| 60 | 10 |
| 60 | 2 |
| 60 | 1 |
| 70 | 5 |
| 70 | 2 |
| 70 | 1 |
| 70 | ½ |
| 70 | ¼ |
| 80 | 1 |
| 90 | 2 |

TABLE 2-continued

| Amounts of chemicals employed as in Example 1 | |
|---|---|
| Temperature (°C.) | Time (h) |
| 100 | ½ |
| 110 | 2 |
| 110 | 1 |
| 120 | 1 |
| 130 | ½ |
| 140 | 2 |
| 140 | 1 |
| 140 | ½ |
| 140 | ¼ |
| 150 | ½ |
| 160 | ½ |
| 170 | ½ |

It is found in this series of experiments that under otherwise identical reaction conditions, an increase in reaction time or an increase of reaction temperature, in particular at >110° C., results in a substantial decrease in brilliance. Equally, it becomes progressively more difficult to obtain concentrated fluid formulations of sufficient viscosity. The solubility in water remains substantially unaffected by these variations of reaction time and reaction temperature.

Further compounds of particular importance are those of the formula IX

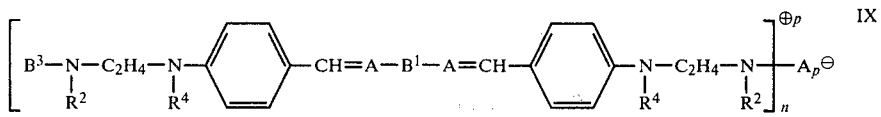

where

A, $B^1$, $B^3$, $R^2$, $R^4$, n, p and $A^{\ominus}$ have the stated meanings and $B^1$, $R^2$, A and $R^4$ may be identical or different.

Examples of preferred radicals are:

$R^4$, A and $B^1$: the radicals mentioned in connection with formula VIII, $B^3$: ethylene, propylene, butylene,

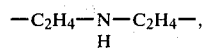

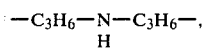

hexamethylene, and $R_2$: hydrogen, methyl, ethyl and hydroxyethyl.

EXAMPLE 3

5 ml of pyrrolidine are added to 42 parts of a compound of the formula 6

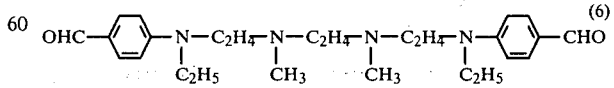

and 18 parts of a compound of the formula 4 in 50 ml of thiodiglycol at 80° C., and the mixture is kept at this temperature for 2 hours. On adding 25 ml of glacial acetic acid and 5 ml of water, a fluid formulation of an oligomeric or polymeric dye of the formula 7

(7)

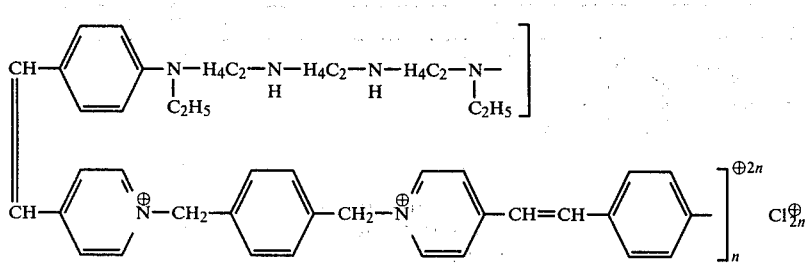

is obtained.

The dye colors groundwood, and bleached and unbleached cellulose, in orange hues, with very little coloration of the waste water.

Similarly, reaction of a bis-aldehyde of the general type

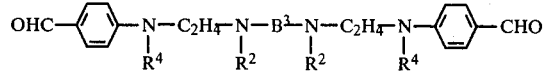

with a compound of the general structure $$H_2A^{\oplus}-B^{1\oplus}-AH_2 \; 2\,A^{\ominus}$$

gives a dye of the general formula IX.

Table 3 gives further examples of dyes of the formula IX, where $A^{\ominus}$ is chloride.

TABLE 3

| $B^3$ | $AH_2$ | $B^1$ | $R^2$ | $R^4$ | Hue |
|---|---|---|---|---|---|
| —$C_2H_4$— | 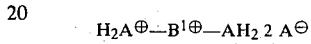 | —$C_2H_4$— | H | $CH_3$ | orange |
| " | " | " |  | $CH_3$ | " | " |
| " | " | " |  | $C_2H_5$ | " |
| " | " | " | " | " | " |
| —$C_3H_6$— | " | " | " | " | " |
| —$C_4H_8$— | " | " | " | " | " |
| —$C_5H_{10}$— | " | " | " | " | " |
| —$C_6H_{12}$— | " | " | " | " | " |
| —$C_2H_4$— | " | —$CH_2$—$C_6H_4$(p)—$CH_2$— | " | " | " |
| —$C_3H_6$— | " | " | " | " | " |
| —$C_4H_8$— | " | " | " | " | " |
| —$C_5H_{10}$— | " | " | " | $CH_3$ | " |
| —$C_6H_{12}$— | benzimidazoline | " | H | $CH_3$ | yellow |
| " | " | " | $CH_3$ | $C_2H_5$ | " |
| " | " | —$CH_2$—$C_6H_4$(m)—$CH_2$— | " | " | " |
| —$C_2H_4$— | " | —$CH_2$—$C_6H_4$(o)—$CH_2$— | " | " | " |

TABLE 3-continued

| $B^3$ | $AH_2$ | $B^1$ | $R^2$ | $R^4$ | Hue |
|---|---|---|---|---|---|
| " | 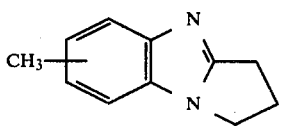 | —C$_4$H$_8$— | " | " | " |
| " | " | —CH$_2$—CH=CH—CH$_2$— | " | " | " |
| —C$_4$H$_8$— | " | —CH$_2$—C≡C—CH$_2$— | " | " | " |
| —C$_2$H$_4$— | " | —C$_5$H$_{10}$— | " | " | " |
| —C$_2$H$_4$—NH—C$_2$H$_4$— | " | —C$_2$H$_4$— | " | " | " |
| —C$_2$H$_4$—N(CH$_3$)—C$_2$H$_4$— | " | " | " | " | " |
| —C$_2$H$_4$—N(CH$_3$)—C$_2$H$_4$— | 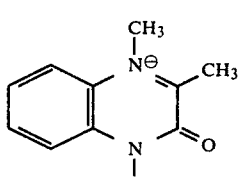 | " | H | " | blue |
| —C$_2$H$_4$—NH—C$_3$H$_6$— | 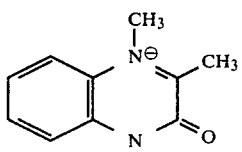 | " | " | CH$_3$ | " |
| C$_2$H$_4$—NH—C$_2$H$_4$—NH—C$_2$H$_4$— | " | " | " | C$_2$H$_5$ | " |
| —C$_2$H$_4$—NH—C$_2$H$_4$— | " | " | " | " | " |
| —C$_2$H$_4$—O—C$_2$H$_4$— | 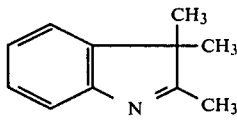 | —CH$_2$—C$_6$H$_4$—CH$_2$— | " | " | red |
| —CH$_2$—C$_6$H$_4$—CH$_2$— | " | —CH$_2$—CH=CH—CH$_2$— | " | " | " |

Further compounds of particular importance are those of the structure X

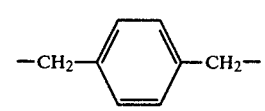

where A, $B^1$, p, n and $A^\ominus$ have the stated meanings and the radicals A may be identical or different.

Examples of preferred radicals $B^1$ are ethylene, propylene, butylene, o-, m- and p-xylylene,

—C$_2$H$_4$—NH—C$_2$H$_4$—NH—C$_2$H$_4$—,

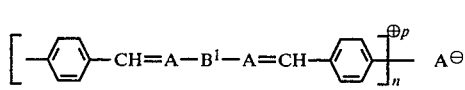

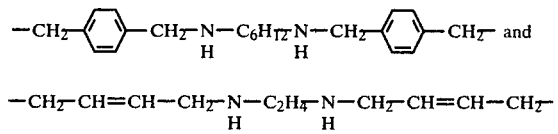 and

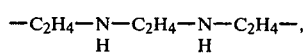

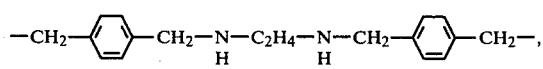

EXAMPLE 4

5 ml of pyrrolidine are added to 21 parts of diphenyl-dialdehyde and 52 parts of a compound of the formula 9 in 50 ml of glycol at 80° C., and the mixture is kept at the same temperature for 2 hours. It is then poured into 500 ml of water, saturated sodium chloride solution is added and the product is filtered off and dried. A yellow dye of the formula

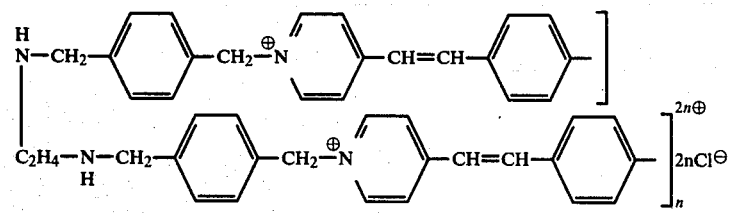

is obtained in good yield. The dye may be used for coloring paper. The waste water is colorless or pale yellow.

Similarly, reaction of diphenylaldehyde with compounds of the general formula

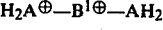

gives dyes of the general formula X.

Table 4 gives examples of other dyes of the formula X.

TABLE 4

| $B^1$ | $AH_2$ | Hue |
|---|---|---|
| $-C_2H_4-$ | ![pyridine with CH3] | yellow |
| $-C_4H_8-$ | " | " |
| $-C_2H_4-\underset{H}{N}-C_2H_4-\underset{H}{N}-C_2H_4-$ | " | " |
| $-C_4H_8-\overset{CH_3}{\underset{CH_3}{\overset{\oplus}{N}}}-C_4H_8-$ | " | " |
| $-C_4H_8-\underset{H}{N}-C_3H_6-\underset{H}{N}-C_4H_8-$ | " | " |
| $-C_2H_4-\underset{H}{N}-C_3H_6-\underset{H}{N}-C_2H_4-$ | " | " |
| $-CH_2-\text{C}_6\text{H}_4-CH_2-$ | " | " |
| $-CH_2-\text{C}_6\text{H}_4-CH_2-\underset{H}{N}-C_2H_4-\underset{H}{N}-CH_2-\text{C}_6\text{H}_4-CH_2-$ | " | " |
| $-CH_2-\text{C}_6\text{H}_4-CH_2-\overset{CH_3}{\underset{CH_3}{\overset{\oplus}{N}}}-C_2H_4-\overset{CH_3}{\underset{}{N}}-CH_2-\text{C}_6\text{H}_4-CH_2-$ | " | " |
| " | ![3,3-dimethyl-2-methylindolenine] | yellowish orange |
| " | ![N-methyl-3-methyl-quinoxalinone N-oxide] | red |
| " | $-CH_2-\text{C}_6\text{H}_4-CH_2-\overset{CH_3}{\underset{CH_3}{\overset{\oplus}{N}}}-C_2H_4-\overset{CH_3}{\underset{CH_3}{\overset{\ominus}{N}}}-CH_2-\text{C}_6\text{H}_4-CH_2$ | " |

TABLE 4-continued

| B¹ | AH₂ | Hue |
|---|---|---|
| —C₄H₈— | " | " |

Further compounds of particular importance are those of the formula XI

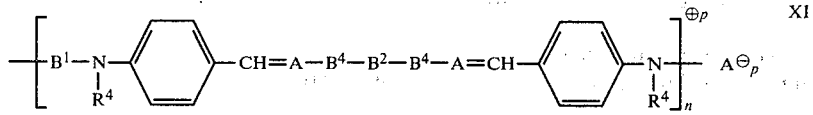

where
A, B², B¹, n, p, R⁴ and A⁻ have the stated meanings,

A and R⁴ may be identical or different and
B⁴ is a bridge member which conforms to the general definition of B¹ but does not carry a positive charge and is not interrupted by a hetero-atom.
Examples of preferred radicals are:
B¹ and B⁴: ethylene, propylene, butylene, o-, m- and p-xylylene and but-2-enylene,
R⁴: ethyl and methyl, and
B²: —HN—C₃H₆—NH—, —HN—C₂H₄—NH— and —HN—C₆H₁₂—NH—.

EXAMPLE 5

33 Parts of a dialdehyde of the formula 8

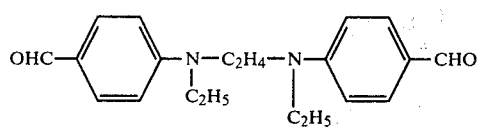

and 52 parts of a compound of the formula 9

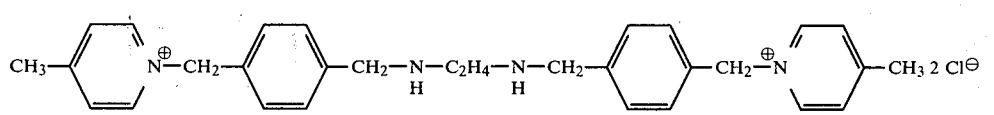

in 50 ml of glycol are heated in the presence of 5 ml of pyrrolidine for 2 hours at 90° C. On adding 50 ml of

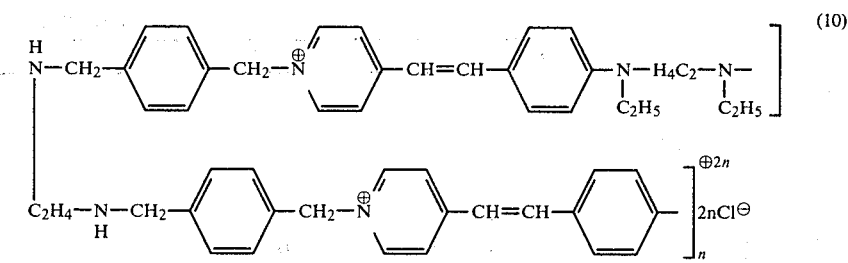

glacial acetic acid, a fluid formulation of a red dye of the formula 10 is obtained. The dye is very readily soluble in water and dyes groundwood and bleached and unbleached cellulose in orange hues. The waste water is colorless or slightly colored.

Using a similar method, reaction of a bisaldehyde of the general formula

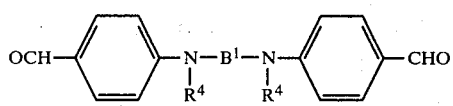

with a compound of the general formula

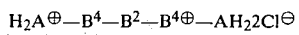

$$H_2A^{\oplus}-B^4-B^2-B^{4\oplus}-AH_2 2Cl^{\ominus}$$

gives a dye of the general formula XI.

Table 5 shows further examples of dyes of the formula XI, where A⁻ is chloride.

TABLE 5

| B¹ | B⁴ | B² | AH₂ | R⁴ | Hue |
|---|---|---|---|---|---|
| —C₂H₄— | —C₂H₄— | —HN—C₂H₄—NH— | CH₃-pyridine | CH₃ | red |
| " | —C₄H₈— | " | " | C₂H₅ | " |
| —CH₂-C₆H₄-CH₂— | " | " | " | " | " |

TABLE 5-continued

| B¹ | B⁴ | B² | AH₂ | R⁴ | Hue |
|---|---|---|---|---|---|
| (o-xylylene —CH₂—C₆H₄—CH₂—) | " | " | " | " | " |
| —C₄H₈— | | —HN—C₃H₆—NH— | " | " | " |
| —C₄H₈— | —CH₂—CH=CH—CH₂— | " | " | " | " |
| " | " | " | (2-methylpyridine) | " | orange |
| —CH₂—C₆H₄—CH₂— | —CH₂—CH=CH—CH₂— | —HN—C₃H₆—NH— | (2-methylpyridine) | C₂H₅ | orange |
| " | " | —HN—C₆H₁₂—NH— | (2-methyl dihydropyrroloquinoline) | " | yellow |
| " | —CH₂—C₆H₄—CH₂— | " | " | " | " |
| " | " | —HN—C₂H₄—NH— | (N-methyl quinoxalinone) | CH₃ | blue |
| " | " | " | " | C₂H₅ | " |
| " | —CH₂—CH=CH—CH₂— | " | " | " | " |
| " | —CH₂—C₆H₄—CH₂— | —HN—C₂H₄—N⁺(CH₃)₂—C₂H₄—NH— | " | " | " |

Further compounds of particular importance are those of the formula XII

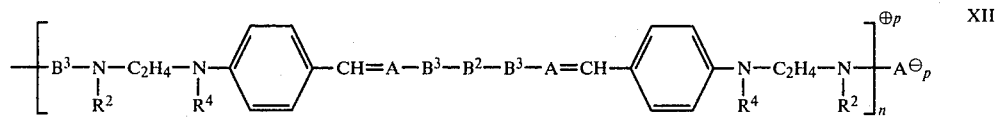

$$\left[ B^3 - \underset{R^2}{N} - C_2H_4 - \underset{R^4}{N} - \text{C}_6\text{H}_4 - CH=A-B^3-B^2-B^3-A=CH - \text{C}_6\text{H}_4 - \underset{R^4}{N} - C_2H_4 - \underset{R^2}{N} - B^3 \right]^{\oplus p}_n A^{\ominus}_p \quad XII$$

where
B³, B², R², R⁴, A, p, A⊖ and n have the stated meanings and
the symbols R², R⁴, T and A may each be identical or different.
Examples of preferred radicals are:
R², R⁴ and A: the radicals stated to be preferred for formula IX,
B³: the radicals B¹ stated to be preferred for formula VIII and
B²: the radicals stated to be preferred for formula XI.

EXAMPLE 6

42 Parts of a dialdehyde of the formula 6 and 52 parts of a compound of the formula 9 in 50 ml of methylglycol are heated in the presence of 10 ml of pyrrolidine for 2 hours at 80° C. On adding 70 ml of glacial acetic acid a fluid formulation of a dye of the formula

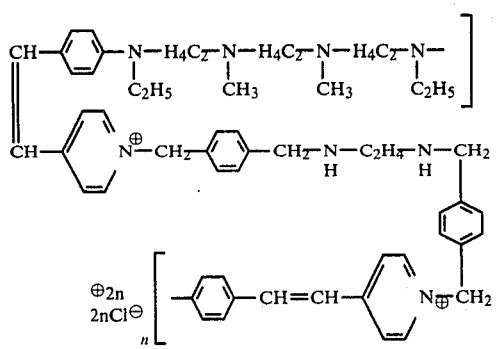

is obtained. The dye may be used for coloring paper. The waste water is only slightly colored.

Using a similar method, reaction of a bis-aldehyde of the general formula

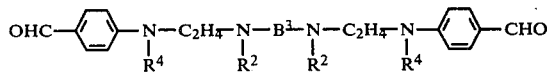

with a compound of the general formula

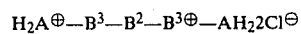

gives a dye of the general formula XII.

Table 6 below gives further examples of dyes of the formula XII.

TABLE 6

| $B^1$ | $B^3$ | $B^2$ | $AH_2$ | $R^2$ | $R^4$ | Hue |
|---|---|---|---|---|---|---|
| $-C_2H_4-$ | $-C_2H_4-$ | $-HN-C_2H_4-NH-$ | 4-methylpyridine | $CH_3$ | $CH_3$ | red |
| " | " | " | " | " | $C_2H_5$ | " |
| " | " | " | " | " | " | " |
| " | $-CH_2-C_6H_4-CH_2-$ | " | " | " | " | " |
| $-C_3H_6-$ | " | " | " | " | " | " |
| $-C_6H_{12}-$ | " | " | " | " | " | " |
| $-C_4H_8-$ | $-C_4H_8-$ | $-HN-C_3H_6-NH-$ | " | " | " | orange |
| " | " | $-C_2H_4-$ | " | " | " | " |
| " | " | $-HN-C_3H_6-NH-$ | " | " | " | " |
| " | $-CH_2-C_6H_4-CH_2-$ | " | " | " | " | " |
| " | " | " | 2,3-dihydro-1H-benzimidazole | $C_2H_5$ | " | yellow |
| $-C_2H_4-$ | " | " | 5-methyl-2,3-dihydro-1H-benzimidazole | " | " | " |
| " | " | " | " | " | $CH_3$ | " |
| " | " | " | " | $CH_3$ | " | " |
| " | " | " | 4-methyl-2,3-dihydro-1H-benzimidazole | " | " | " |
| $-C_3H_6-$ | $-CH_2-CH=CH-CH_2-$ | " | " | $C_2H_5$ | " | " |
| $-C_2H_4-$ | | $-HN-C_2H_4-NH-$ | 1,3-dimethyl-quinoxalinone | " | $C_2H_5$ | blue |
| | $-CH_2-C_6H_4-CH_2-$ | | | | | |
| " | $-C_3H_6-$ | " | " | " | $CH_3$ | " |
| " | $-C_4H_8-$ | $-HN-C_3H_6-NH-$ | " | " | " | " |

Further compounds of particular importance are those of the formula XIII $$\left[-B^2-\underset{}{\underset{}{\bigcirc}}-CH=\underset{O}{\underset{\|}{C}}-\underset{X}{\overset{|}{C}}-M-B^6-M-\underset{O}{\underset{\|}{C}}-\underset{X}{\overset{|}{C}}=CH-\underset{}{\underset{}{\bigcirc}}-\right]_n^{\oplus p} A_p^{\ominus} \quad \text{XIII}$$

where X, M, p, n and $A^{\oplus}$ have the stated meanings and the radicals M and X may be identical or different.

Radicals $B^2$ are those, within the scope of the general definition given, which are derived from a triamine or amine of higher functionality, and in which one or more amino groups may be quaternized. Radicals $B^6$ are radicals within the scope of the general definition of $B^1$ which do not carry a quaternary charge.

Examples of preferred radicals are:

$B^6$: ethylene, propylene, p-phenylene and butylene,

M: oxygen, $B^2$: 
$$-N-C_2H_4\overset{\oplus}{\underset{CH_3}{\overset{|}{N}}}-C_2H_4-N-,$$
$$\underset{C_2H_5}{|}\qquad \underset{CH_3}{|}\qquad \underset{C_2H_5}{|}$$

$$-N-(C_2H_4-N-)_2C_2H_4-N-,$$
$$\underset{CH_3}{|}\qquad \underset{H}{|}\qquad \underset{CH_3}{|}$$

$$-N-C_3H_6\overset{\oplus}{\underset{CH_3}{\overset{|}{N}}}-C_3H_6-N-,$$
$$\underset{CH_3}{|}\qquad \underset{CH_3}{|}\qquad \underset{CH_3}{|}$$

$$-N-C_2H_4\overset{\oplus}{\underset{CH_3}{\overset{|}{N}}}-C_2H_4\overset{\oplus}{\underset{CH_3}{\overset{|}{N}}}-C_2H_4-N- \text{ and}$$
$$\underset{CH_3}{|}\qquad \underset{CH_3}{|}\qquad \underset{CH_3}{|}\qquad \underset{CH_3}{|}$$

$$-N-C_2H_4\overset{\oplus}{\underset{CH_3}{\overset{|}{N}}}-CH_2-\underset{}{\underset{}{\bigcirc}}-CH_2-\overset{\oplus}{\underset{CH_3}{\overset{|}{N}}}-C_2H_4-N-, \text{ and}$$
$$\underset{C_2H_5}{|}\qquad \underset{CH_3}{|}\qquad \underset{CH_3}{|}\qquad \underset{CH_3}{|}$$

X: —CN.

EXAMPLE 7

A mixture of 17 parts of cyanoacetic acid and 37 parts of acetic anhydride is heated for 1 hour at 70° C. and then cooled to 40° C., and 18 parts of a compound of the of the formula $$HO-C_2H_4-\underset{CH_3}{\overset{|}{N}}-C_2H_4-\underset{CH_3}{\overset{|}{N}}-C_2H_4-OH$$

are added. The mixture is then stirred for a further hour at 40° C. Thereafter 76 parts of a bis-aldehyde of the formula $$OHC-\underset{}{\underset{}{\bigcirc}}-\underset{CH_3}{\overset{|}{N}}-C_2H_4-\overset{\oplus}{\underset{C_2H_5}{\overset{|}{N}}}-C_2H_4-\overset{\oplus}{\underset{C_2H_5}{\overset{|}{N}}}-C_2H_4-\underset{CH_3}{\overset{|}{N}}-\underset{}{\underset{}{\bigcirc}}-CHO$$
$$\qquad\qquad\qquad\qquad\underset{C_2H_5}{}\qquad\underset{C_2H_5}{}$$

are added and the mixture is heated for 6 hours at 80° C. On adding 100 parts of glacial acetic acid, a fluid formulation of a yellow dye of the formula $$\left[\begin{array}{c}CH-\underset{}{\underset{}{\bigcirc}}-N-H_4C_2-\overset{\oplus}{\underset{C_2H_5}{\overset{C_2H_5}{\overset{|}{N}}}}-H_4C_2-\overset{\oplus}{\underset{C_2H_5}{\overset{C_2H_5}{\overset{|}{N}}}}-H_4C_2-N-\\ \underset{CH_3}{|}\qquad\qquad\qquad\qquad\qquad\qquad\underset{CH_3}{|}\\ \underset{CNO}{\overset{}{\underset{}{C-C-O-C_2H_4-N-C_2H_4-N-C_2H_4-O-C-C=CH-\underset{}{\underset{}{\bigcirc}}}}}\\ \qquad\qquad\underset{CH_3}{|}\qquad\underset{CH_3}{|}\qquad\underset{O}{}\qquad\underset{CN}{}\end{array}\right]_n^{\oplus 2n} 2nCH_3SO_4^{\ominus}$$

is obtained. The dye may be used for coloring paper.

Using a similar method, reacton of a compound of the general formula $$E-B^6-E$$

where E may be OH or $$\underset{NR^2}{H}$$

and where $R^2$ has the stated meanings, with a mixed anhydride of the formula $$CH_2\underset{\underset{O}{\overset{\|}{C-Q}}}{\overset{CN}{\diagup}}$$

where Q is the radical of an organic or inorganic acid, preferably of acetic acid or hydrochloric acid, followed by condensation with a dialdehyde of the general formula $$OHC-\underset{}{\underset{}{\bigcirc}}-B^2-\underset{}{\underset{}{\bigcirc}}-CHO$$

gives a dye of the general formula XIII.

Table 7 which follows shows further dyes of the general formula XIII where X is CN. These dyes are yellow.

TABLE 7

| B⁶ | B² | M |
|---|---|---|
| —C₂H₄—N(CH₃)—C₂H₄—N(CH₃)—C₂H₄— | —N(C₂H₅)—C₂H₄—N⊕(CH₃)₂—C₂H₄—N(CH₃)—C₂H₄—N(CH₃)— | —O— |
| " | —N(C₂H₅)—C₂H₄—N⊕(CH₃)₂—CH₂—C₆H₄—CH₂—N⊕(CH₃)₂—C₂H₄—N(C₂H₅)— | " |
| —C₂H₄— | —N(C₂H₅)—C₂H₄—N⊕(CH₃)—C₂H₄—N⊕(CH₃)—C₂H₄—N(C₂H₅)— | " |
| —C₃H₆— | —N(C₂H₅)—C₂H₄—N⊕(CH₃)₂—CH₂—(m-C₆H₄)—CH₂—N⊕(CH₃)₂—C₂H₄—N(C₂H₅)— | " |
| " | " | —NH— |
| " | " | —N(CH₃)— |
| —C₆H₄— (p) | " | —N(H)— |
| " | " | —O— |
| —CH₂—C₆H₄—CH₂— | —N(CH₃)—C₂H₄—N⊕(CH₃)₂—CH₂—C₆H₄—CH₂—N⊕(CH₃)₂—C₂H₄—N(CH₃)— | " |
| " | " | —NH— |
| —C₂H₄—N(CH)—C₂H₄—N(CH₃)—C₂H₄— | —N(CH₃)—C₂H₄—N(CH₃)—C₂H₄—N(CH₃)—C₂H₄—N(CH₃)— | —O— |

Further compounds of particular importance are those of the formula XIV

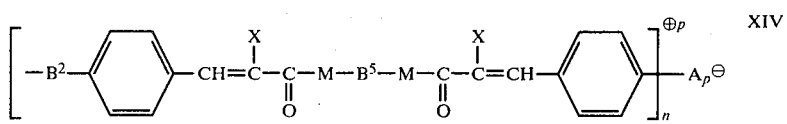

where
X, M, B², n, p and A⊖ have the stated meanings,
the radicals M and X may be identical or different and
B⁵ is a bridge member, within the scope of the definition of B¹, which carries one or more positive charges.
Examples of preferred radicals are:

B²: —N(CH₃)—C₂H₄—N(C₂H₅)—, —N(C₂H₅)—C₂H₄—N(CH₃)—, —N⟨piperazine⟩N—,

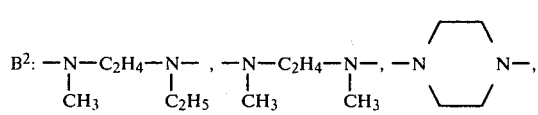

-continued

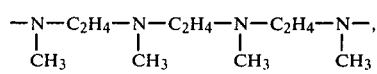

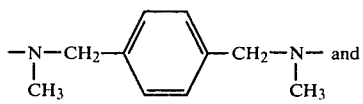

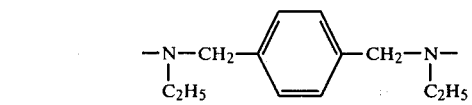

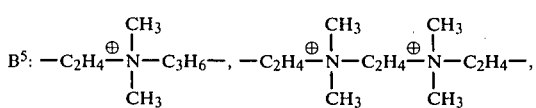

B⁵: 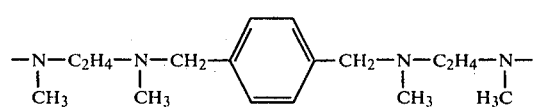

-continued

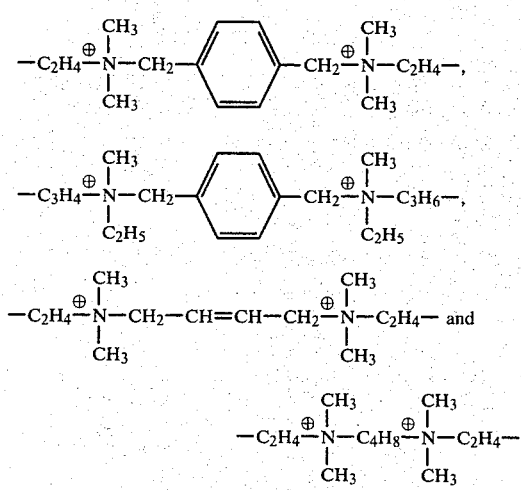

M: oxygen and
X: —CN.

EXAMPLE 8

A mixture of 17 parts of cyanoacetic acid and 37 parts of acetic anhydride is heated for 1 hour at 70° C. and cooled to 40° C., and 41 parts of a compound of the formula

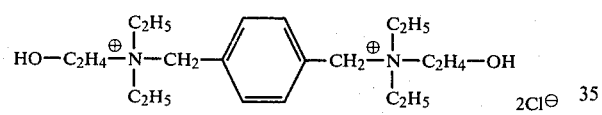

are added. Stirring is continued for 1 hour at 40° C. 28 parts of diphenylpiperazinedialdehyde are then added to the reaction mixture, which is heated for 7 hours at 80° C. On adding 50 parts of glacial acetic acid, a fluid formulation of a yellow dye of the formula

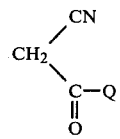

is obtained. The dye colors groundwood and bleached and unbleached cellulose in yellow hues. The waste water is colorless or slightly colored.

Using a similar method, reaction of a compound of the general formula $$E—B^5—E$$

where
E may be OH or $NH_2$ and
$B^5$ is a bridge member, within the scope of the definition of $B^1$, which carries one or more positive charges, with a mixed anhydride of the formula

where Q is the radical of an organic or inorganic acid, preferably of acetic acid or hydrochloric acid, followed by condensation with a dialdehyde of the general formula

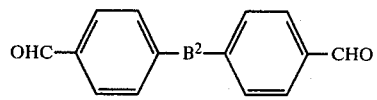

gives a day of the general formula XIV.

Table 8 below shows further dyes of the general formula XIV, where X is CN. These dyes are yellow.

TABLE 8

| $B^5$ | $B^2$ | M |
|---|---|---|
| —C₂H₄—N⁺(CH₃)(CH₃)—C₂H₄—N⁺(CH₃)(CH₃)—C₂H₄— | —N(CH₃)—C₂H₄—N(CH₃)— | —O— |
| —C₂H₄—N⁺(C₂H₅)(C₂H₅)—C₃H₆—N⁺(CH₃)(CH₃)—C₂H₄— | —N(C₂H₅)—C₂H₄—N(CH₃)— | " |
| —C₂H₄—N⁺(C₂H₅)(C₂H₅)—C₄H₈—N⁺(C₂H₅)(C₂H₅)—C₂H₄— | —N(piperazine)N— | " |

TABLE 8-continued

| B⁵ | B² | M |
|---|---|---|
| $-C_3H_6-\overset{\oplus}{\underset{CH_3}{\overset{CH_3}{N}}}-C_2H_4-\overset{\oplus}{\underset{CH_3}{\overset{CH_3}{N}}}-C_3H_6-$ | " | " |
| $-C_2H_4-\overset{\oplus}{\underset{\underset{C_6H_5}{CH_2}}{\overset{CH_3}{N}}}-C_2H_4-\overset{\oplus}{\underset{\underset{C_6H_5}{CH_2}}{\overset{CH_3}{N}}}-C_2H_4-$ | " | " |
| $-C_2H_4-\overset{\oplus}{\underset{CH_3}{\overset{CH_3}{N}}}-C_3H_6-$ | $-\underset{}{\overset{C_2H_5}{N}}-CH_2-\phantom{xx}\text{(C}_6\text{H}_4\text{)}\phantom{xx}-CH_2-\overset{C_2H_5}{\underset{}{N}}-$ | " |
| $-C_2H_4-\overset{\oplus}{\underset{C_2H_5}{\overset{C_2H_5}{N}}}-C_3H_6-$ | $-\underset{}{\overset{CH_3}{N}}-CH_2-\phantom{xx}\text{(C}_6\text{H}_4\text{)}\phantom{xx}-CH_2-\overset{CH_3}{\underset{}{N}}-$ | " |
| $-C_2H_4-\overset{\oplus}{\underset{\underset{C_6H_5}{CH_2}}{\overset{CH_3}{N}}}-C_2H_4-$ | $-\overset{CH_3}{\underset{}{N}}-C_2H_4-\overset{CH_3}{\underset{}{N}}-$ | " |
| $-C_2H_4-\overset{\oplus}{\underset{CH_3}{\overset{CH_3}{N}}}-C_2H_4-$ | $-\overset{CH_3}{\underset{}{N}}-CH_2-\phantom{xx}\text{(C}_6\text{H}_4\text{)}\phantom{xx}-CH_2-\overset{CH_3}{\underset{}{N}}-$ | " |
| $-C_2H_4-\overset{\oplus}{\underset{C_2H_5}{\overset{C_2H_5}{N}}}-CH_2-\phantom{xx}\text{(C}_6\text{H}_4\text{)}\phantom{xx}-CH_2-\overset{\oplus}{\underset{C_2H_5}{\overset{C_2H_5}{N}}}-C_2H_4-$ | $-\overset{CH_3}{\underset{}{N}}-C_4H_8-\overset{CH_3}{\underset{}{N}}-$ | " |
| $-C_3H_6-\overset{\oplus}{\underset{CH_3}{\overset{CH_3}{N}}}-CH_2-\phantom{xx}\text{(m-C}_6\text{H}_4\text{)}\phantom{xx}-CH_2-\overset{\oplus}{\underset{CH_3}{\overset{CH_3}{N}}}-C_3H_6-$ | $-N\underset{}{\overset{\frown}{\phantom{xx}}}N-$ (piperazine) | " |
| " | $-\overset{CH_3}{\underset{}{N}}-C_2H_4-\overset{CH_3}{\underset{}{N}}-$ | $-\overset{}{\underset{H}{N}}-$ |
| " | $-N\underset{}{\overset{\frown}{\phantom{xx}}}N-$ | " |
| $-C_2H_4-\overset{\oplus}{\underset{CH_3}{\overset{CH_3}{N}}}-CH_2-\phantom{xx}\text{(m-C}_6\text{H}_4\text{)}\phantom{xx}-CH_2-\overset{\oplus}{\underset{CH_3}{\overset{CH_3}{N}}}-C_2H_4-$ | $-N(CH_2C_6H_5)-CH_2-CH=CH-CH_2-N(CH_2C_6H_5)-$ | $-O-$ |
| $-C_2H_4-\overset{CH_3}{\underset{}{N}}-C_2H_4-\overset{\oplus}{\underset{CH_3}{\overset{CH_3}{N}}}-C_2H_4-\overset{CH_3}{\underset{}{N}}-C_2H_4-$ | $-\overset{}{\underset{CH_3}{N}}-C_2H_4-\overset{}{\underset{CH_3}{N}}-$ | " |

TABLE 8-continued

| $B^5$ | $B^2$ | M |
|---|---|---|
| $-C_2H_4-\overset{\oplus}{\underset{CH_3}{\overset{CH_3}{N}}}-C_2H_4-\overset{\oplus}{\underset{CH_3}{\overset{CH_3}{N}}}-C_2H_4-$ | $-\underset{CH_3}{N}-C_2H_4-\overset{\oplus}{\underset{CH_3}{\overset{CH_3}{N}}}-C_2H_4-\underset{CH_3}{\overset{CH_3}{N}}-C_2H_4-$ | " |
| " | $-\underset{CH_3}{N}-C_2H_4-\overset{\oplus}{\underset{CH_3}{\overset{CH_3}{N}}}-C_2H_4-\underset{CH_3}{\overset{CH_3}{N}}-C_2H_4-$ | " |
| " | $-\underset{C_2H_5}{N}-C_2H_4-\underset{H}{N}-C_2H_4-\underset{H}{N}-C_2H_4-\underset{C_2H_5}{N}-$ | " |

EXAMPLE 9

50 Parts of a compound of the formula

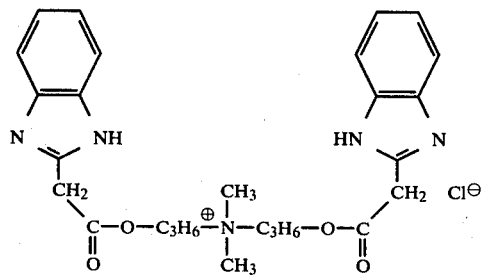

and 33 parts of a dialdehyde of the formula 8 in 50 ml of glycol are heated to 80° C., 2 ml of pyrrolidine are added and the mixture is kept at 80° C. for 2 hours. On adding 100 ml of glacial acetic acid, a fluid formulation of a yellow dye of the formula is obtained. The dye colors paper in yellow hues, with little color in the waste water.

Using a similar method, reaction of a compound of the general formula

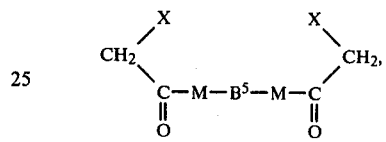

where X is an electron-attracting substituent other than CN, with a dialdehyde of the general formula

CHC—⌬—$B^2$—⌬—CHO gives a dye of the general formula XIV.

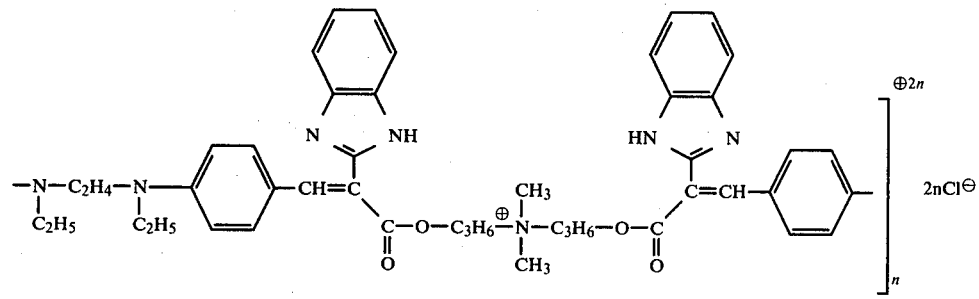

Table 9 which follows shows further dyes of the general formula XIV. These dyes are yellow, unless stated otherwise.

TABLE 9

| $B^5$ | $B^2$ | X | M |
|---|---|---|---|
| $-C_2H_4-\overset{\oplus}{\underset{CH_3}{\overset{CH_3}{N}}}-CH_2-⌬-CH_2-\overset{\oplus}{\underset{CH_3}{\overset{CH_3}{N}}}-C_2H_4-$ | $-N\underset{\diagdown\diagup}{\diagup\diagdown}N-$ | benzimidazole | O |
| " | $-\underset{CH_3}{N}-C_2H_4-\underset{CH_3}{N}-$ | " | " |

TABLE 9-continued

| B⁵ | B² | X | M | Hue |
|---|---|---|---|---|

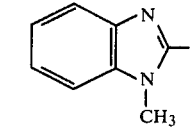

We claim:
1. A paper stock dyed with a polymeric dye of the formula I

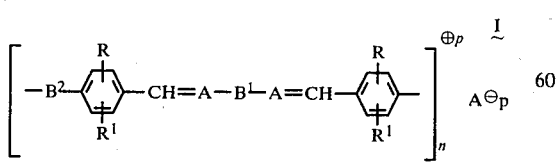 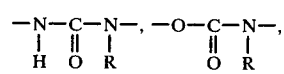

wherein,
B¹ is a bridge member selected from the group consisting of: lower alkylene, substituted lower alkylene, lower alkylene and substituted lower alkylene containing —NH—, —S—, —O—, carbamyl, carbonyloxy, $$-\underset{\underset{H}{|}}{N}-\underset{\underset{O}{\|}}{C}-\underset{\underset{R}{|}}{N}-,\ -O-\underset{\underset{O}{\|}}{C}-\underset{\underset{R}{|}}{N}-,$$

phenylene, substituted phenylene, napthylene, cycloalkylene, and heteroatom containing cycloalkylene radicals;
B² is a direct bond between dye molecule units or is a bridge member selected from the group consisting of:

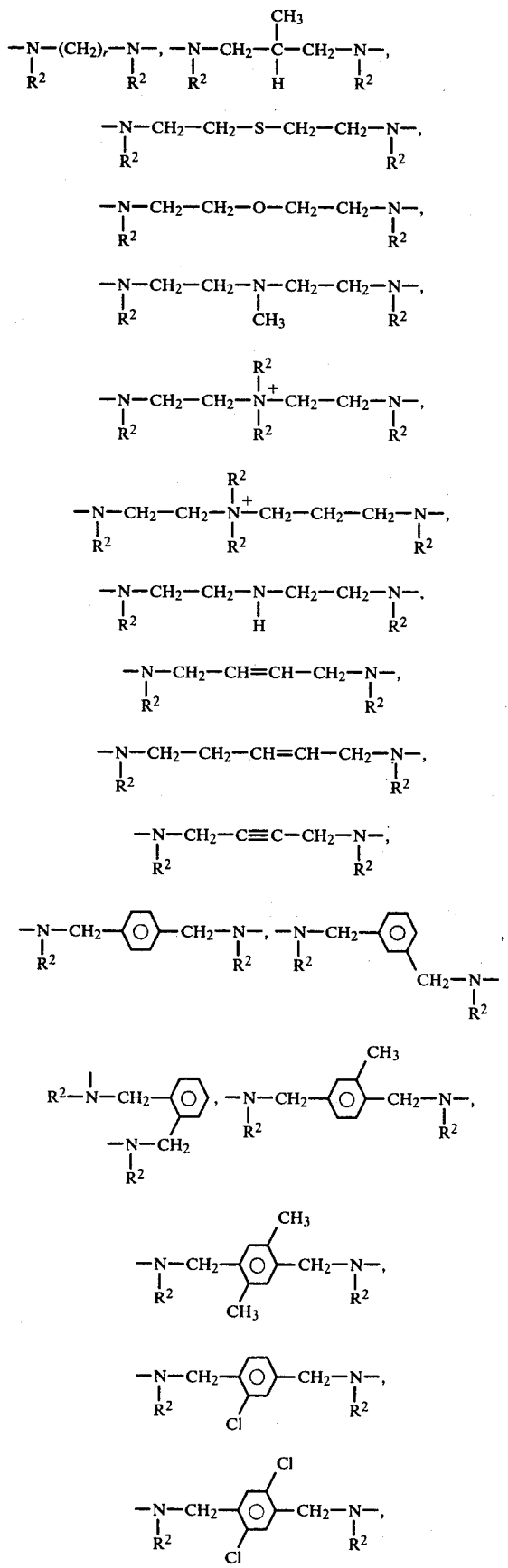
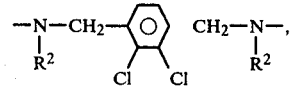
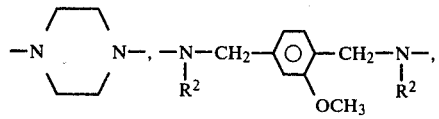
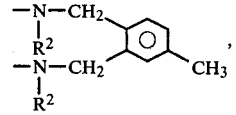
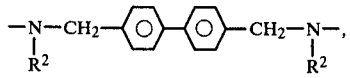
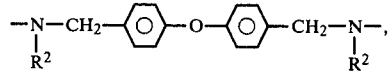
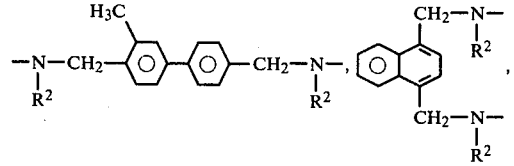
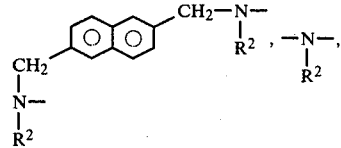
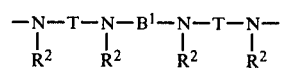

wherein R is lower alkylene, hydroxy-substituted lower alkylene, $C_1$–$C_4$ alkoxy, chloro, bromo or phenylene radicals; $R^2$ is hydrogen, lower alkyl, or substituted lower alkyl radical; $B^1$ is as already defined; and r is an integer from 1 to 6, n is a number > 1, p is the number of positive charges, $A^-$ is an anion, R is hydrogen, chloro, bromo, hydroxyl, $C_1$–$C_8$ alkyl, nitro, $C_1$–$C_8$ alkoxy, $C_1$–$C_8$ alkoxycarbonyl, cyano, hydroxycarbonyl, unsubstituted or substituted carbamyl or unsubstituted or substituted amino, $R^1$ is hydrogen, chloro, hydroxyl, $C_1$–$C_4$ alkyl or $C_1$–$C_4$ alkoxy or, R and $R^1$ together are an unsubstituted or substituted fused ring, or R and $R^1$ together with $B^2$ are a heterocyclic radical, T is a straight-chain or branched alkylene radical which is unsubstituted or substituted by hydroxyl, $C_1$–$C_4$ alkoxy, chlorine or bromine, or is a phenylene radical, A is the radical of a methylene-active compound selected from the group consisting of:

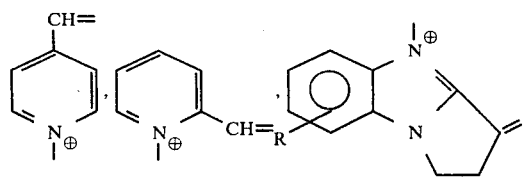

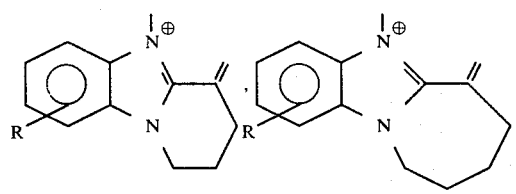

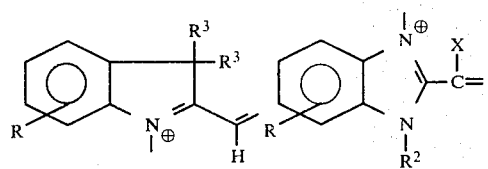

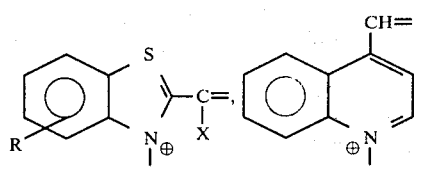

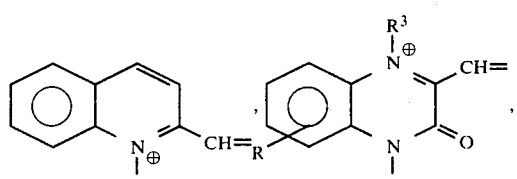

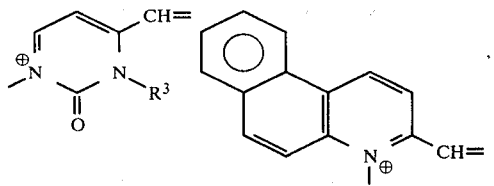

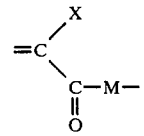

wherein R and $R^2$ are as already defined; $R^3$ is lower alkyl or substituted lower alkyl; X is hydrogen, cyano, $C_1$–$C_8$ carbamyl, $C_1$–$C_4$ alkyl, or a heterocyclic radical; M is an oxygen atom or an imino group, having the structure $$-\underset{\underset{R^2}{|}}{N}-,$$

and X and M may form a ring structure incorporating heteroatoms therein.

2. The paper stock dyed with a polymeric dye as in claim 1, wherein the dye has the formula:

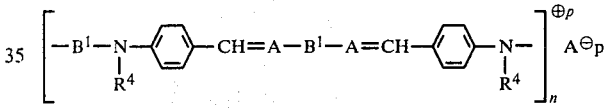

wherein, A, $B^1$, n, p and $A^-$ are as claimed in claim 1; and $R^4$ is $C_1$–$C_4$ alkyl, β-cyanoethyl, cyanomethyl, β-chloroethyl, β-hydroxyethyl, 2-hydroxy-3-chloropropyl, and B-$C_1$-$C_4$-alkoxyethyl.

* * * * *